(12) United States Patent
Nagamine et al.

(10) Patent No.: US 8,819,534 B2
(45) Date of Patent: Aug. 26, 2014

(54) INFORMATION PROCESSING SYSTEM AND INFORMATION PROCESSING METHOD

(75) Inventors: Takeshi Nagamine, Kanagawa (JP); Yutaka Andoh, Kanagawa (JP); Kengo Omura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1758 days.

(21) Appl. No.: 11/342,638

(22) Filed: Jan. 31, 2006

(65) Prior Publication Data
US 2007/0043763 A1 Feb. 22, 2007

(30) Foreign Application Priority Data
Aug. 16, 2005 (JP) .................................. 2005-236175

(51) Int. Cl.
G07F 17/30 (2006.01)
G06F 7/00 (2006.01)
G06Q 10/10 (2012.01)

(52) U.S. Cl.
CPC ..................................... *G06Q 10/10* (2013.01)
USPC ............................ 715/201; 715/234; 715/239

(58) Field of Classification Search
USPC ........................................................ 715/201
See application file for complete search history.

(56) References Cited

U.S. PATENT DOCUMENTS

| | | | | |
|---|---|---|---|---|
| 5,579,471 A * | 11/1996 | Barber et al. | ................. | 715/700 |
| 5,613,032 A * | 3/1997 | Cruz et al. | ..................... | 386/241 |
| 5,831,616 A * | 11/1998 | Lee | ................ | 715/861 |
| 6,288,801 B1 * | 9/2001 | Leberl et al. | ................. | 358/474 |
| 6,771,818 B1 * | 8/2004 | Krumm et al. | ................ | 382/225 |
| 7,653,925 B2 * | 1/2010 | Hull et al. | ..................... | 715/231 |
| 2002/0099552 A1 * | 7/2002 | Rubin et al. | .................. | 704/270 |
| 2004/0160635 A1 * | 8/2004 | Ikeda et al. | ................. | 358/1.15 |
| 2004/0202382 A1 * | 10/2004 | Pilu | ............................. | 382/276 |
| 2005/0109070 A1 * | 5/2005 | Kobayashi et al. | ............ | 68/3 R |
| 2005/0265562 A1 * | 12/2005 | Rui | ................................ | 381/92 |
| 2006/0288273 A1 * | 12/2006 | Erol et al. | .................... | 715/512 |

FOREIGN PATENT DOCUMENTS

| | | |
|---|---|---|
| JP | A 7-56748 | 3/1995 |
| JP | A 2005-234722 | 9/2005 |

OTHER PUBLICATIONS

Mizuno et al, "Data Queries using DATA Visualization Techniques," 1997, Proceeding of the 1997 IEEE International Conference on System, Man, and Cybernetic (SMC '97), pp. 2392-2396.*

Dar-Shyang Lee et al. "Portable Meeting Recorder," Dec. 1-6, 2002, Juan-les-Pins, France, Proceedings of the tenth ACM international conference on Multimedia, pp. 493-502.*

\* cited by examiner

*Primary Examiner* — Doug Hutton, Jr.
*Assistant Examiner* — Ariel Mercado
(74) *Attorney, Agent, or Firm* — Oliff PLC

(57) ABSTRACT

An information processing system includes a memory portion that stores each scene of image information of a given space captured by an image capturing portion in association with positional information on an object existent in the given space, a receiving portion that receives information that specifies the object as a search request, and a search portion that searches the image information stored in the memory portion for a scene where the object is existent in a given position on the basis of the search request.

12 Claims, 18 Drawing Sheets

FIG. 2

CONFERENCE INFORMATION
— CONFERENCE ID: 0123
    — PARTICIPANT: WORKER A, WORKER B, WORKER C, WORKER E, WORKER F
    — DATA: JANUARY 31, 2005
    — TIME: 13:23:00 – 14:33:00
    — CONFERENCE ROOM: CONFERENCE ROOM 21
    — DEVICE AND FACILITY: PROJECTOR, PROJECTION SCREEN, WHITEBOARD
    — LINK TO VIDEO DATA
    — OPERATION STATE:
TIME, WORKER A, WORKER B, WORKER C, WORKER E, WORKER F, PROJECTOR, PROJECTION SCREEN, WHITEBOARD

```
0000, 2:4:0, 4:4:0, 3:4:0, 4:1:1, 4:2:0, 2:3:0, 1:3:0, 2:1:0
0001, 2:4:0, 4:4:0, 3:4:0, 4:1:1, 4:2:0, 2:3:0, 1:3:0, 2:1:0
0002, 2:4:0, 4:4:0, 3:4:0, 4:1:1, 4:2:0, 2:3:0, 1:3:0, 2:1:0
0003, 2:4:0, 4:4:0, 3:4:0, 3:1:1, 4:2:0, 2:3:0, 1:3:0, 2:1:0
0004, 2:4:0, 4:4:0, 3:4:0, 3:1:1, 4:2:0, 2:3:0, 1:3:0, 2:1:0
              :
              :
4197, 2:4:0, 4:4:0, 3:4:0, 4:1:1, 4:2:0, 2:3:0, 1:3:0, 2:1:0
4198, 2:4:0, 4:4:0, 3:4:0, 4:1:1, 4:2:0, 2:3:0, 1:3:0, 2:1:0
4199, 2:4:0, 4:4:0, 3:4:0, 4:1:1, 4:2:0, 2:3:0, 1:3:0, 2:1:0
4200, 2:4:0, 4:4:0, 3:4:0, 4:1:1, 4:2:0, 2:3:0, 1:3:0, 2:1:0
```

— CONFERENCE ID: 0124
    :
    :

FIG. 9

| 1, 3 | 2, 3    | 3, 3 |
|------|---------|------|
| 1, 4 | A(2, 4) | 3, 4 |
| 1, 5 | 2, 5    | 3, 5 |

FIG. 10

| 1, 3 | 2, 3    | 3, 3    | 4, 3    |
|------|---------|---------|---------|
| 1, 4 | A(2, 4) | C(3, 4) | B(4, 4) |
| 1, 5 | 2, 5    | 3, 5    | 4, 5    |

ABlock / cBlock

| CONFERENCE ID | ROOM | DATE | TIME | PARTICI-PANT | CORRES-PONDING TIME | | | | | | |
|---|---|---|---|---|---|---|---|---|---|---|---|
| 0123 | 21 | JAN. 31 | 13:23:00 – 14:33:00 | ABC EF | 0 | 1 | 2 | 3 | : | 4199 | 4200 |
| 0124 | 41 | FEB. 3 | 10:45:00 – 11:38:00 | ABC E | 245 | 246 | 247 | 248 | : | 3230 | 3231 |

FIG. 14A

| CONFERENCE ID | ROOM | DATE | TIME | PARTICI-PANT | CORRES-PONDING TIME | | | | | | |
|---|---|---|---|---|---|---|---|---|---|---|---|
| 0123 | 21 | JAN. 31 | 13:23:00 — 14:33:00 | ABC EF | 0 | 1 | 2 | 3 | : | 4199 | 4200 |
| 0124 | 41 | FEB. 3 | 10:46:00 — 11:38:00 | ABC E | 245 | 246 | 247 | 248 | : | 3230 | 3231 |

FIG. 14B

| CONFERENCE ID | ROOM | DATE | TIME | PARTICI-PANT | CORRES-PONDING TIME | | | | | | |
|---|---|---|---|---|---|---|---|---|---|---|---|
| 0123 | 21 | JAN. 31 | 13:23:00 — 14:33:00 | ABC EF | 3 | 4 | 5 | 6 | : | 320 | 321 |

FIG. 15

| CONFERENCE ID | ROOM | DATE | TIME | PARTICI-PANT | CORRES-PONDING TIME | | | | | | |
|---|---|---|---|---|---|---|---|---|---|---|---|
| 0123 | 21 | JAN. 31 | 13:23:00 — 14:33:00 | ABC EF | 3 | 4 | 5 | 6 | : | 287 | 288 |

FIG. 18A

RESULT OF SCENE 1

| CONFERENCE ID | ROOM | DATE | TIME | PARTICI-PANT | CORRES-PONDING TIME | | | | | | |
|---|---|---|---|---|---|---|---|---|---|---|---|
| 0123 | 21 | JAN. 31 | 13:23:00 — 14:33:00 | ABC EF | 203 | 345 | 346 | 380 | : | 3789 | 3921 |
| 0124 | 41 | FEB. 3 | 10:45:00 — 11:38:00 | ABC E | 102 | 803 | 804 | 815 | : | 2994 | 3003 |

FIG. 18B

RESULT OF SCENE 2

| CONFERENCE ID | ROOM | DATE | TIME | PARTICI-PANT | CORRES-PONDING TIME | | | | | | |
|---|---|---|---|---|---|---|---|---|---|---|---|
| 0124 | 41 | FEB. 3 | 10:45:00 — 11:38:00 | ABC E | 801 | 802 | 803 | 804 | : | 3107 | 3109 |

FIG. 21

CONFERENCE INFORMATION
— CONFERENCE ID: 0201
       — PARTICIPANT: WORKER A, WORKER B, WORKER C
       — DATA: FEBRUARY 20, 2005
       — TIME: 13:23:00 – 14:33:00
       — CONFERENCE ROOM: CONFERENCE ROOM 21
       — DEVICE AND FACIITY: PROJECTOR, PROJECTION SCREEN, WHITEBOARD
       — LINK TO VIDEO DATA
       — OPERATION:
TIME, WORKER A, WORKER B, WORKER C, PROJECTOR, PROJECTION SCREEN, WHITEBOARD

```
0000, 1:4:0:S, 4:4:0:S, 3:4:0:S, 2:3:0, 1:3:0, 2:1:0
0001, 1:4:0:S, 4:4:0:S, 3:4:0:S, 2:3:0, 1:3:0, 2:1:0
0002, 1:4:0:S, 4:4:0:S, 3:4:0:S, 2:3:0, 1:3:0, 2:1:0
0003, 2:4:0:S, 4:4:0:W, 3:4:0:S, 2:3:0, 1:3:0, 2:1:0
0004, 2:4:0:S, 4:4:0:W, 3:4:0:S, 2:3:0, 1:3:0, 2:1:0
          :
          :
4197, 2:4:0:S, 4:4:0:E, 3:4:0:S, 2:3:0, 1:3:0, 2:1:0
4198, 2:4:0:S, 4:4:0:E, 3:4:0:S, 2:3:0, 1:3:0, 2:1:0
4199, 2:4:0:E, 4:4:0:E, 3:4:0:S, 2:3:0, 1:3:0, 2:1:0
4200, 2:4:0:E, 4:4:0:E, 3:4:0:S, 2:3:0, 1:3:0, 2:1:0
```

— CONFERENCE ID: 0202

| 2, 3 | 3, 3 | 4, 3 |
| --- | --- | --- |
| 2, 4 | C(3, 4) | 4, 4 |
| 2, 5 | 3, 5 | 4, 5 |

| CONFERENCE ID | ROOM | DATE | TIME | PARTICI-PANT | CORRES-PONDING TIME | | | | | | |
| --- | --- | --- | --- | --- | --- | --- | --- | --- | --- | --- | --- |
| 0201 | 21 | FEB. 20 | 13:23:00 –14:33:00 | ABC | 3 | 4 | 5 | 6 | ; | 4197 | 4198 |

INFORMATION PROCESSING SYSTEM AND INFORMATION PROCESSING METHOD

BACKGROUND OF THE INVENTION

1. Field of the Invention

This invention relates to an information processing system and information processing method.

2. Description of the Related Art

With the advancement of computing technology these days, computers are ubiquitous in the office and home. With this widespread use, computers are capable of supporting various types of application. For instance, conferences are held frequently in industrial activities or other activities in everyday life. Computers can be employed for supporting the operation of the conference, when they are used in the conference room.

Decisions made in the conference can be reviewed by reading the minutes to be issued later. Also, there is proposed a technique of supporting the review of the conference when the user views the video that has captured the conference. At this time, it is important how efficiently a desired scene can be searched for. Japanese Patent Application Publication No. 07-56748 (hereinafter, referred to as Document 1) describes a technique of creating a chart with remarks during the conference and making a list so that the user can specify a time to view the image of the specified time, With the conventional method as described above, however, the related image of the time (the image that corresponds to the specified time) cannot be searched for with the positional relationship of the object and the person in the real scene that is not included in the image. As a technique for solving this problem, Japanese Patent Application Publication No. 2005-234722 (hereinafter, referred to as Document 2) proposes a technique of receiving the content that the user can remember easily as a query and returning the matched scene to the user. There may be a technique of storing the positions of the participants and the documents used in the conference as context information of the conference. With this technique, the user is able to view the context information and access the detailed context information while recalling the content of the conference.

Nevertheless, an image searching method does not cover all the positional relationships of the objects and persons in a real space. For example, in Document 2, a conference room is selected at first, and then the person and object are arranged, Unless the user can select the conference room, one of some standard layouts is selected to arrange the person and object. However, if the user can remember the arrangement of the person and object, yet if the user cannot remember the layout of the conference room, the afore-described method cannot be utilized. In addition, as the context information of the conference to be viewed is increased, it takes the user much time to search for the information that the user likes to obtain.

SUMMARY OF THE INVENTION

The present invention has been made in view of the above circumstances and provides an information processing system and information processing method, whereby a given scene can be narrowed in an image by using a positional relationship of objects such as a person or thing.

According to one aspect of the present invention, there is provided an information processing system including: a memory portion that stores each scene of image information of a given space captured by an image capturing portion in association with positional information on an object existent in the given space; a receiving portion that receives information that specifies the object as a search request; and a search portion that searches the image information stored in the memory portion for a scene where the object is existent in a given position on the basis of the search request. According to the present invention, it is possible to narrow a given scene by utilizing the positional relationship of the objects such as a person or thing.

According to another aspect of the present invention, there is provided an information processing method including: receiving information that specifies an object as a search request; and searching image information of a given space for a scene where the object is existent in a given position on the basis of the search request, the image information of the given space being captured by an image capturing portion and stored in association with positional information on the object existent in the given space.

BRIEF DESCRIPTION OF THE DRAWINGS

Embodiments of the present invention will be described in detail based on the following figures, wherein:

FIG. 2 is a view showing an example of a conference data structure in a conference DB:

FIG. 9 is a view showing the adjacent blocks of a worker A at the time of 0000 second;

FIG. 10 is a view showing the adjacent blocks of the worker A and those of the worker C at the time of 0000 second;

FIG. 14A shows a search result of a scene 1;

FIG. 14B shows the search result of a scene 2;

FIG. 15 is a view showing an example of the search result of a common portion of the scene 1 and the scene 2;

FIG. 18A is the search result of the scene 1;

FIG. 18B is the search result of the scene 2;

FIG. 21 is a view showing a data structure of the conference data in the conference DB;

DESCRIPTION OF THE EMBODIMENTS

Figure 1:
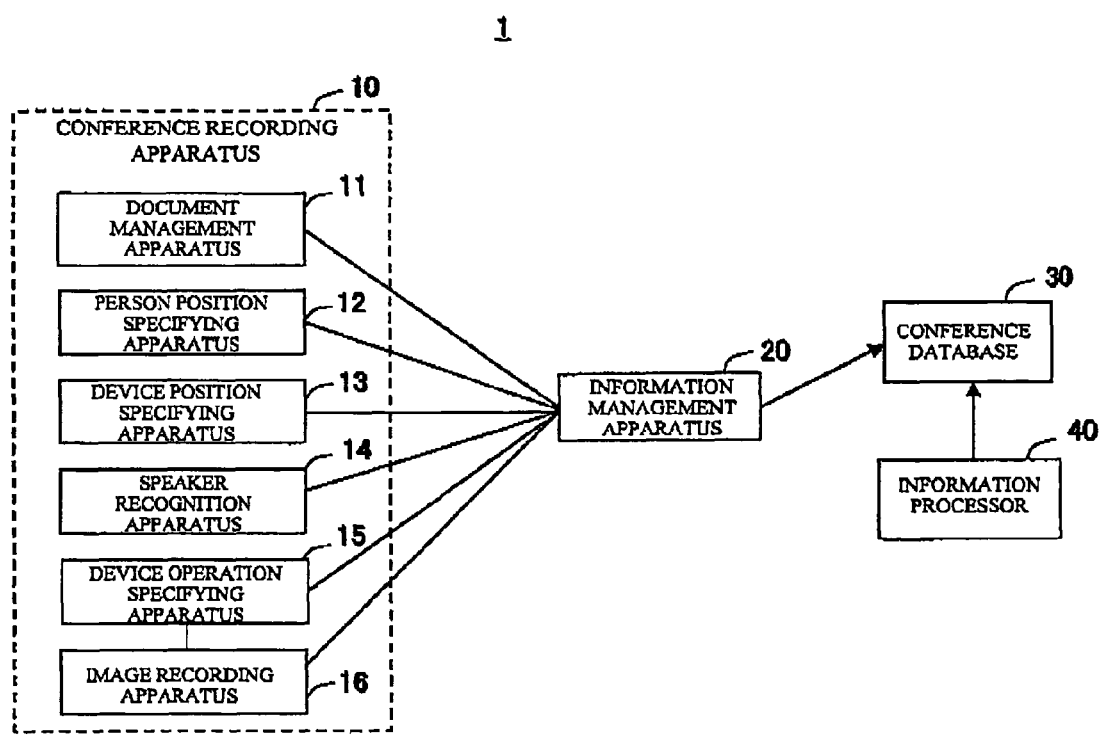
FIG. 1 is a view showing a whole configuration of a system in accordance with the present invention.

A description will now be given, with reference to the accompanying drawings, of embodiments of the present invention. FIG. 1 is a view showing a whole configuration of a system in accordance with the present invention. An information system 1 includes a conference recording apparatus 10, an information management apparatus 20, a conference database (DB) 30, and an information processor 40. The conference recording apparatus 10 records conference information. The information management apparatus 20 controls and manages the conference information recorded in the conference recording apparatus 10. The conference database (DB) 30 serves as a memory portion. The conference recording apparatus 10 includes a document management apparatus 11, a person position specifying apparatus 12, a device position specifying apparatus 13, a speaker recognition apparatus 14, a device operation specifying apparatus 15, and an image recording apparatus 16. The image recording apparatus 16 serves as an image capturing portion. In a description hereafter, an object includes one or more persons, one or more devices or apparatuses, and facilities. A conference room will be exemplarily described as a space. Company employees attend the conference as participants. The conference recording apparatus 10 is provided in each conference room. A conference ID is given to the conference recording apparatus 10 installed in each conference room.

The document management apparatus 11 manages a document for use in each conference, and is composed of hardware or software that captures the image of the document being projected by a projector and a projection period thereof, for example, software that records a file name of the slide document being projected on the screen and a title of each page together with the time, or software that records URL (Uniform Resource Locator) that was accessed together with the time. Specifically, the document management apparatus 11 is composed of, for example, software that monitors the slide being displayed on the personal computer coupled to the projector or software that monitors open and close of the document file.

The person position specifying apparatus 12 specifies the position of each participant in the conference room. The person position specifying apparatus 12 includes an IC tag (RFID tag) that records a person's ID and a reader that reads the person's ID in the IC tag. Each person has an ID card into which the IC tag is embedded. The IC tag records the person's ID that can specify an individual. Multiple readers are installed on the floor or sidewall of the conference room to read the person's ID. For example, a reader is installed in the center of lattice-shaped segments on the floor of the conference room. The reader reads the person's ID and a remark flag at certain intervals and sends such read information to the information management apparatus 20. The reader may be installed on a desk as a position recognition method. The reader is capable of recognizing the position of the person who is sitting around the desk and the direction that the person faces by installing one or more readers on the positions that face respective seats. The positional information of the person may be obtained automatically, by utilizing the position estimate technique with an ultrasonic sensor or the sound source estimate technique with a microphone array on the person position specifying apparatus 12.

The device position specifying apparatus 13 specifies the positions of the devices and facilities such as a table or white board in the conference room and stores them. The device position specifying apparatus 13 operates in the same manner as the person position specifying apparatus 12 does. The devices and facilities include, for example, a movable white board, chair, desk, screen, display, printer, speaker and any other thing provided in the conference room. The speaker recognition apparatus 14 recognizes a speaker in the conference and records the speaker. The speaker recognition apparatus 14 has a circuit that turns on a remark flag that shows there is a remark stronger than a certain strength, operating with, for example, a small-sized microphone and a writing device in the ID card carried by each person, and then transmits a person's ID, reader's ID, and the remark flag to the information management apparatus 20. The speaker recognition apparatus 14 maybe realized by utilizing the sound recognition technique. The device operation specifying apparatus 15 monitors an operation state of the device such as a projector or light provided in the conference room, and sends any change in the operation state to the information management apparatus 20. The image recording apparatus 16 is composed of, for example, a camcorder, and transmits the moving image being recorded to the information management apparatus 20.

The information management apparatus 20 inquires the conference DB 30, obtains a new conference ID, and internally stores a pair of the conference ID and the conference room (a conference ID list). Then, the information management apparatus 20 creates a new record in the conference DE 30, and stores the conference ID, name of the conference room, date, and time therein. At this time, the information management apparatus 20 sends a starting date and a starting time to the conference DB 30 to store them. The user gives an instruction on an end of the conference to the conference recording apparatus 10, when the user finishes recording. The conference recording apparatus 10 sends the conference name and also sends that the conference has been finished to the information management apparatus 20. The information management apparatus 20 acquires a corresponding conference ID from the conference ID list, and records an end time and a period of the conference. The information management apparatus 20 deletes the corresponding conference room name and the conference ID from the conference ID list. The information management apparatus 20 refers to the ID list, searches the conference room name for the conference ID, and stores the video image on a record that corresponds to the conference ID that has been searched for.

In processing on the person position specifying apparatus 12 and the speaker recognition apparatus 14, while the conference is being recorded, the remark of the person who carries the ID card is detected by the microphone embedded in the ID card. When the person position specifying apparatus 12 detects the person's remark, the speaker recognition apparatus 14 turns on the remark flag of a wireless IC tag buried in the ID card. The person position specifying apparatus 12 is turned off when the remarks are not detected. The persons' IDs are recorded in the wireless IC tag to specify the person to be read by the reader. Here, a wireless method specified in ISO5693 is employed. The reader sends the person's ID, the remark flag, the reader ID of the reader, and the conference room name in which the reader is installed, to the information management apparatus 20. The information management apparatus 20 acquires the name of the person with a person's ID conversion list, and obtains the conference ID using the conference ID list. The information management apparatus 20 sends the information to the conference DB 30. Here, the reader reads the information every second.

The device position specifying apparatus 13 is capable of using the same method as that of the person position specifying apparatus 12 by applying the wireless IC tag, to the devices and facilities to which IDs are given. Therefore, a description is omitted here. The device operation specifying apparatus 15 monitors on and off of the power of the projector and light while the conference is being recorded. The device operation specifying apparatus 15, if there is a change in the state of on and off, transmits the name of the device, the state of the device subsequent to the change, and the conference room name, to the information management apparatus 20. The information management apparatus 20 searches the conference ID list for the conference name, obtains the conference ID to record the conference ID, device ID, device state, and time. The information management apparatus 20 receives the video image, the person's ID and the remark flag read by each reader, the reader's ID, and the operation state of the device to store in the conference DB 30. At this time, the information transmitted from the start to end of the conference recording apparatus 10 is stored as one record.

The conference DB 30 stores each scene of the image information of a given space in association with the positional information of the object existent in the space. The image information is captured by the image recording apparatus 16, and the given space denotes the conference room, here. The conference DB 30 stores meta data of each conference. The conference DB 30 stores one record that corresponds to each conference. Each record includes, as additional information a conference ID, date and time of the conference, identifier of an object, namely, identifier of participant or facility, conference room name, position of the participant, remark state of the participant (person), position of the device or facility, operation state of the device, and use state of the device and facility. The additional information is stored in association with video data, which is the image information. FIG. 2 is a view showing an example of a conference data structure in the conference DB 30. An ID is given to each conference in the conference data stored in the conference DB 30, and the conference data includes the participants of the conference, data, time, conference room, facilities or devices that are installed. Also, the conference DB 30 records a link to the video data of the conference, and also records the position of each participant and whether the participant is making a remark in every second, as an operation state. With respect to the facility and device in the conference room, the positions and the operation states are listed. The position can be represented, for example, by segmenting the room into a lattice shape having a fixed width, for example, a width of 40 centimeters so that a block where a person or device is existent can be represented by X-Y coordinates when the block is counted from one corner of the room.

For instance, as an example of the operation state, a description will be given of "0004, 2:4:0, 4:4:0, 3:4:0, 3:1:1, 4:2:0, 2:3:0, 1:3:0, 2:1:0". At 4 (0004) seconds from the beginning of the conference, a worker A is existent at 2 in X-coordinate and 4 in Y-coordinate in the conference room, and does not make a remark (0). A worker B is existent at 4 in X-coordinate and 4 in Y-coordinate, and does not make a remark (0). With respect to the following worker C, worker E, and worker F, X-coordinates, Y-coordinates, and the remark states thereof are shown. With respect to the devices, for example, a white board is existent at 2 in X-coordinate and 1 in Y-coordinate. An electric appliance such as a projector is represented by 1 or 0 to correspond to ON and OFF. If there is no ON/OFF state such as the white board, 0 is always set. Here, it does not matter how to acquire the metadata. It is desirable to give the afore-described information automatically, yet the information may be input manually. The above-described additional information maybe recorded for each scene of the image information in the conference DB 30.

Figure 3:
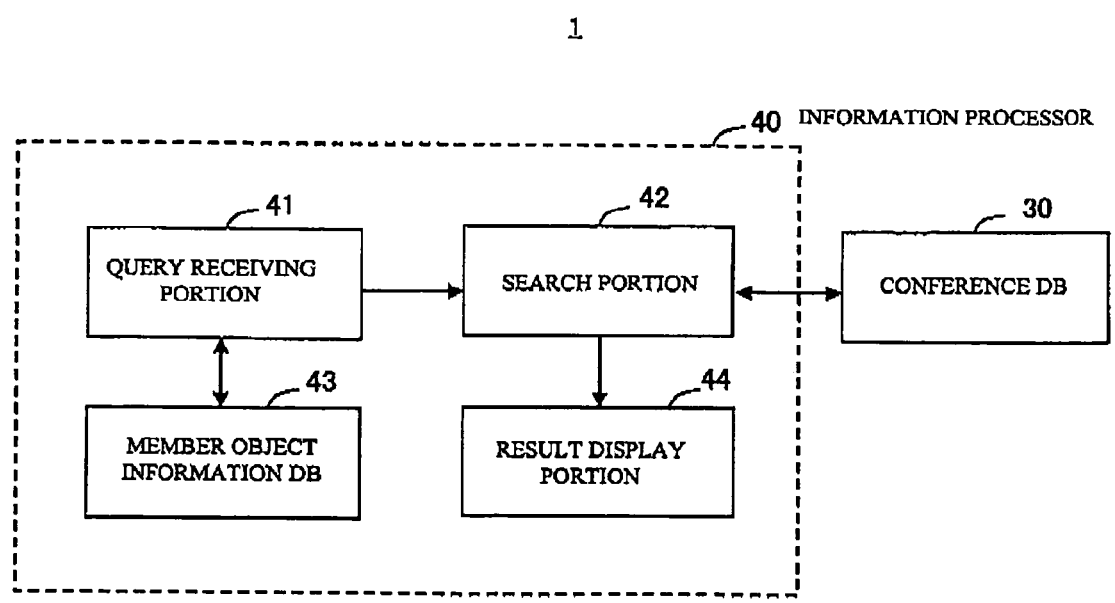
FIG. 3 is a view showing a configuration example of an information processor in accordance with the present invention.

FIG. 3 is a view showing a configuration example of the information processor 40 in accordance with the present invention. The information processor 40 includes a query receiving portion 41, a search portion 42, a member object information DB 43, and a result display portion 44. The query receiving portion 41 serves as a receiving portion, and the result display portion 44 serves as a display portion. A reference numeral 1 represents the information processing system, and a reference numeral 30 represents the conference DB. The information processor 40 has capabilities of searching the image information for a scene in which an object is existent in a given position, on the basis of the user's search request. The query receiving portion 41 is equipped with a GUI (Graphical User Interface) that receives the user's operation, and has capabilities of monitoring the user's operation on the GUI, receiving the information that specifies the object as a search request, and issuing a query to the search portion 42. Here, the query denotes a process request for the database management system, which is represented by a character string.

The member object information DB 43 registers in advance the information on members attending the conference and the information on the objects such as devices and facilities existent in the conference room, as a queue used for a search. By use of the information input by the user manually or the information obtained from the person position specifying apparatus 12 and the device position specifying apparatus 13 shown in FIG. 1, the information on the members attending the conference and the information on the objects such as devices and facilities existent in the conference room is registered in the member object information DB 43 in advance. The search portion 42 searches the image information in the conference DB 30 for a scene where the object is existent at a given position, and transmits the search result to the result display portion 44. The result display portion 44 has a GUI to display to the user, the search result searched by the search portion 42. The result display portion 44 has capabilities of displaying the search result received from the search portion 42. Here, if the query receiving portion 41 receives the additional information from the user as a search request, the search portion is capable of searching the image information in the conference DB 30 for a scene that matches the search request.

Figure 4:
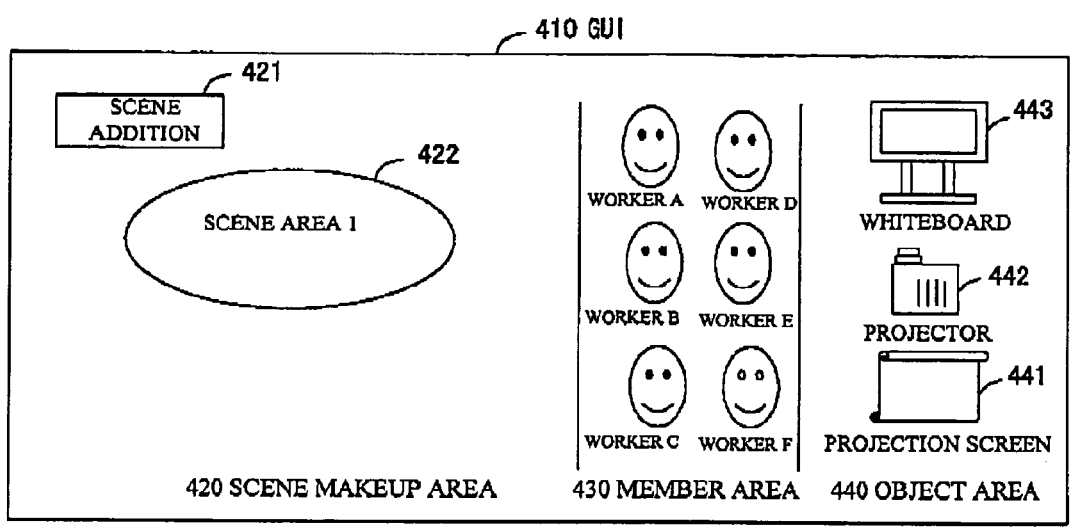
FIG. 4 is a view showing a GUI provided by a query receiving portion.

FIG. 4 is a view showing a GUI provided by the query receiving portion 41. A GUI 410 is composed of a scene makeup area 420, a member area 430, and an object area 440. The scene makeup area 420 is a workspace for making up a scene to issue a query. The scene makeup area 420 includes a scene addition button 421, and a scene area 422 is added whenever the user pushes the scene addition button 421 by mouse or the like. Persons' icons made with photos and names of members (the worker A through the worker F), who have a possibility to take part in the conference, are displayed on the member area 430. The information of the members is registered in the member object information DB 43 in advance. The photo and name are obtainable when the query receiving portion 41 inquires the member object information DB 43. The query receiving portion 41 may display an employee number or title on the member area 430 as other pieces of information.

Icons of the facilities or devices, which are installed in the conference room, are displayed on the object area 440. Here, assuming that the white board is registered in the member object information DB 43 as a facility provided in the conference room, and the projector and projection screen are registered as the devices installed in the conference room. Accordingly, the object are a 440 displays an icon 441 of the projection screen, an icon 442 of the projector, and an icon 443 of the whiteboard. The afore-mentioned information is registered in the member object information DB 43 in advance. The persons' icons (of the worker A through the worker F) and icons 441 through 443 of the devices and facilities serve as a portion that specifies the additional information.

The query receiving portion 41 inquires the member object information DB 43 to acquire photos or abstract icons, and the names of the devices or facilities, and displays the persons' icons (of the worker A through the worker F) or the icons 441 through 443 of the devices or facilities. In addition, the query receiving portion 41 receives the search request according to the operation of the persons' icons (of the worker A through the worker F) or the icons 441 through 443 of the devices or facilities. For example, the query receiving portion 41 receives the search request in a format where the persons' icons (of the worker A through the worker F) or the icons 441 through 443 of the devices or facilities are arranged in given areas.

Figure 5:
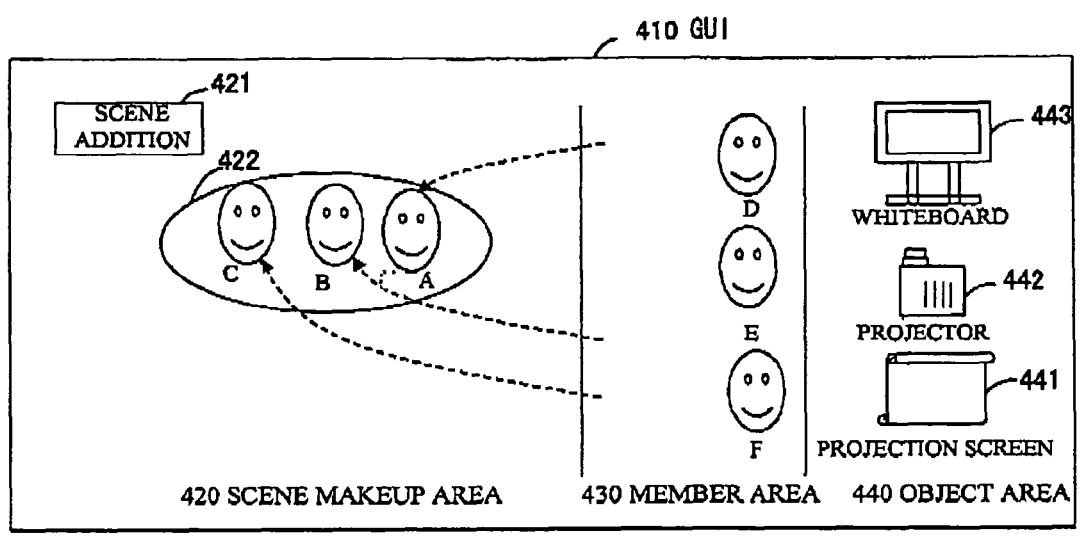
FIG. 5 is a view showing a GUI provided by the query receiving portion.
Figure 6:
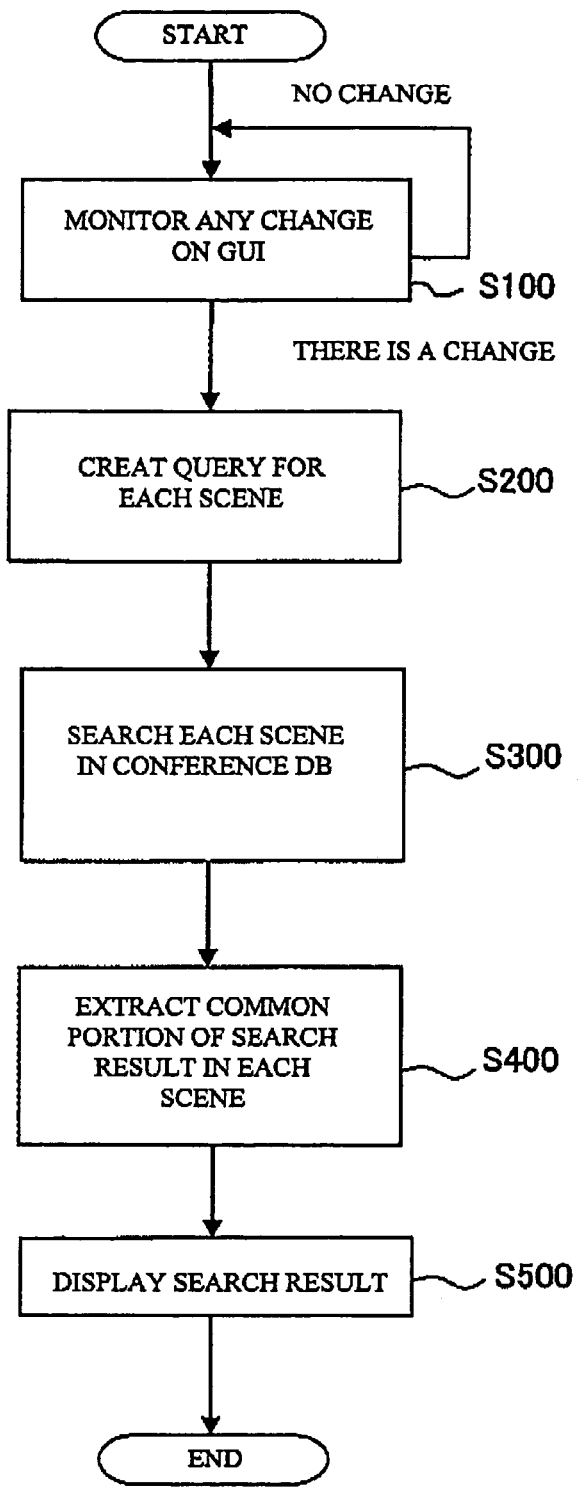
FIG. 6 is a flowchart showing an operation process of the information processor.
Figure 7:
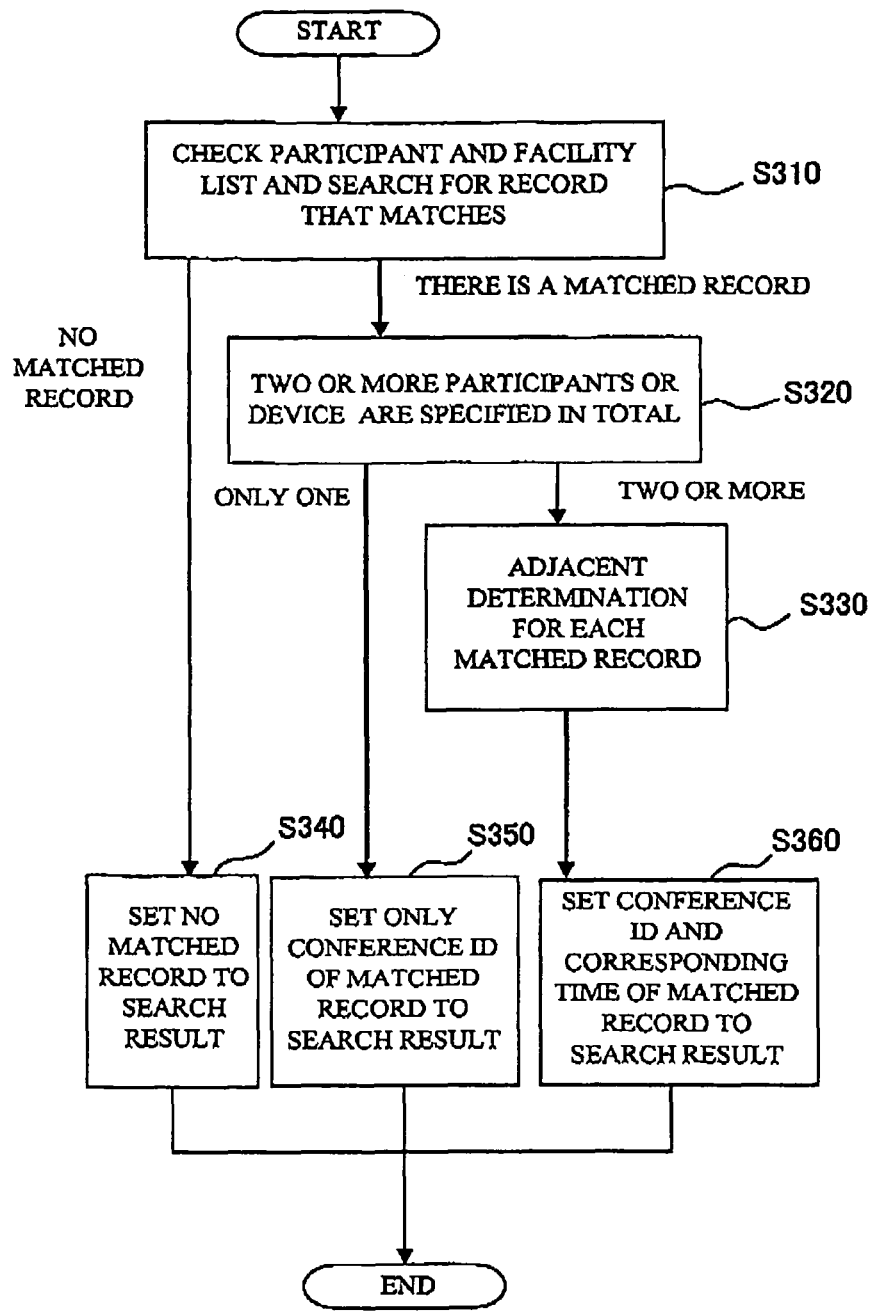
FIG. 7 is a flowchart showing a process of a search made by a search portion in the information processor.
Figure 8:
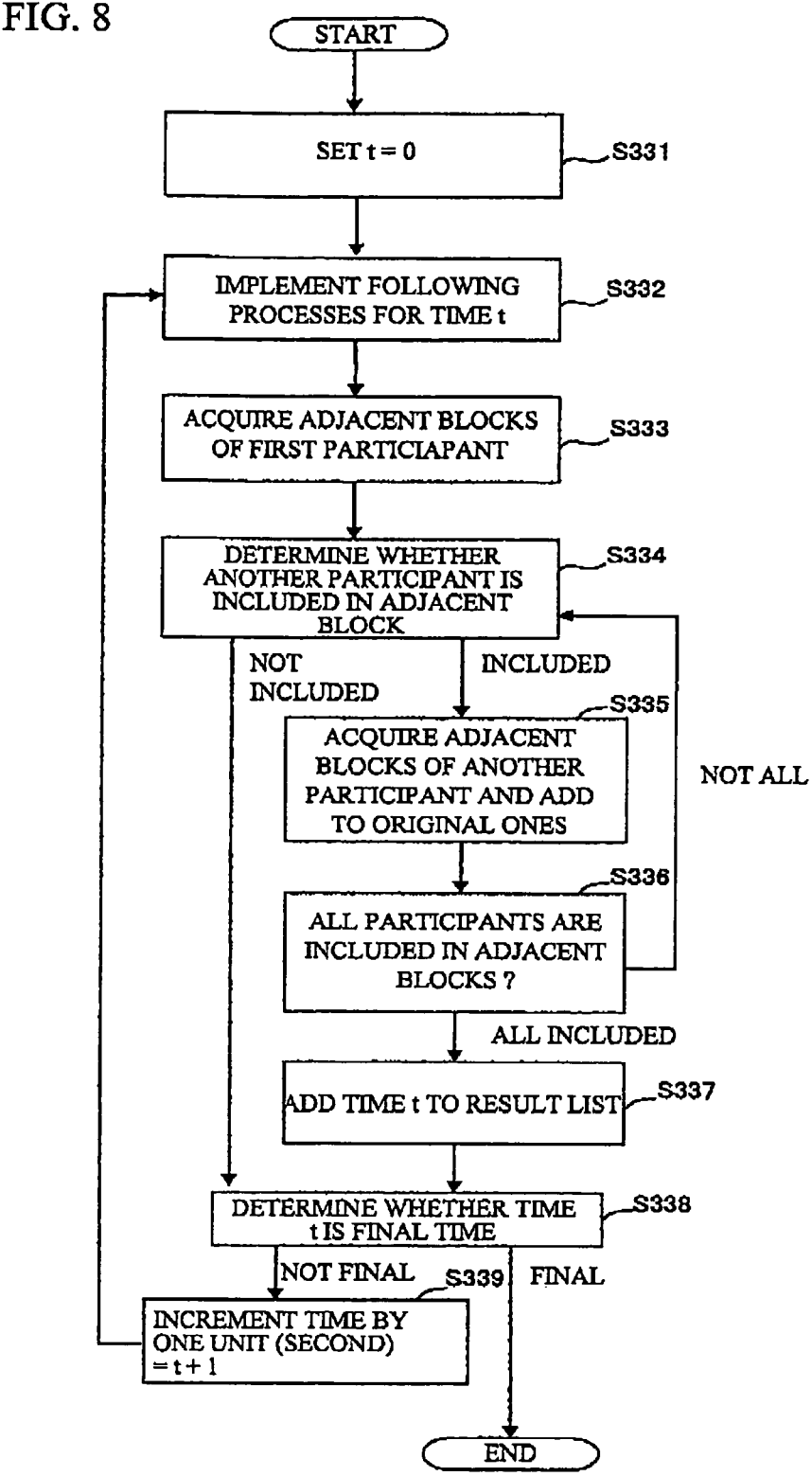
FIG. 8 is a flowchart showing a process of calculating adjacent blocks made by the search portion in the information processor.

Next, a description will be given of an operation example of the information processor 40 in detail. FIG. 5 is a view showing a GUI provided by the query receiving portion 41. FIG. 6 is a flowchart showing an operation process of the information processor 40. FIG. 7 is a flowchart showing a process of a search made by the search portion 42 in the information processor 40. FIG. 8 is a flowchart showing a process of calculating adjacent blocks made by the search portion 42 in the information processor 40.

When the user likes to review a scene, the user is able to search for the scene by using the GUI 410. First, the user recalls the scene, and remembers that the worker B and the worker A are immediately adjacent to the user (the worker C). The query receiving portion 41 monitors whether the scene addition button 421 is pushed (step S100 in FIG. 6), and displays the scene area 422 on the scene makeup area 420. When the user drags and drops the icon of the worker C, representing himself or herself, together with the icons of the workers A and B, the query receiving portion 41 monitors this change on the GUI 410 (step S100 in FIG. 6). If there is a change on the GUI 410, the query receiving portion 41 generates a search request with the state of the GUI 410 (step S200 in FIG. 6) and sends this to the search portion 42.

The search request issued in the state where the workers A, B, and C are arranged on the scene area 422, as a scene 1, is shown below.

Scene 1: worker A, worker B, worker C

The search portion 42 receives a query from the query receiving portion 41 and searches the conference DB 30 on the basis of the query received (step S300 in FIG. 6).

The search portion 42 searches a participant and device and facility field in the conference DB 30 for a matched record (step S310). More specifically, the search portion 42 searches the conference metadata that includes the participants and devices in the search request. At this time, the search portion 42 carries out a search by obtaining a matching of the participants and devices included in the search request and the participant and device and facility field in each conference record. If there is no matched record, the search portion 42 goes to step S340 and sets the search result to no matched record (step 5340). If there is a matched record, the search portion 42 goes to step S320 to acquire the conference ID of the matched record, as a result. Here, the workers A, B, and care specified in the scene area 422 as the scene 1, and the search portion 42 searches for a conference that includes them as participants. For example, two conference IDs, ID 0123 and ID 0124 are searched.

Subsequently, the search portion 42 checks whether two or more participants or devices are specified in total (step S320). If only one participant or device is specified, the conference ID of the matched record is set to the search result (step S350). In step S320, if there are two or more participants or devices are totally specified, the search portion 42 goes to step S330. If multiple participants are specified in the conference having the conference ID obtained, the search portion 42 determines whether the specified participants are existent in adjacent blocks (step S330 in FIG. 7).

At this time, the search portion 42 searches the field of the operation state of the searched conference ID every second whether the specified participant is existent in an adjacent block. More specifically, as discussed below, the search portion 42 acquires the positional information of a first participant (or device). Here, the search portion 42 acquires the positional information of the worker A. Then, the search portion 42 sets a time t=0 (step S331). The search portion 42 implements the following process with respect to the time t (step S332). First, the search portion 42 acquires an adjacent block on the basis of the positional information acquired with respect to the first participant (step S333). FIG. 9 is a view showing adjacent blocks of the worker A at the time of 0000 second. For example, with respect to the conference ID 0123, if the worker A is existent in (X, Y)=(2, 4) at 0 second, for example, all the adjacent blocks are obtained by adding or subtracting X or Y by 1. In this case, the search portion 42 obtains 8 adjacent blocks of (2, 4), which are (1, 3), (2, 3), (3, 3), (3, 4), (3, 5), (2, 5), (1, 5), and (1, 4).

FIG. 10 is a view showing A Block and C Block at the time of 0000 second. A Block represents the adjacent blocks of the worker A, and C Block represents the adjacent blocks of the worker C. Then, the search portion 42 determines whether another participant is included in the adjacent block at a give time (step S334 in FIG. 8). Here, the search portion 42 determines whether another participant is included in the adjacent block of the worker A. In this case, the worker C is existent in a block (3, 4) and the search portion 42 determines that another participant is included in the adjacent block. If no participant is included in any of the adjacent blocks, the search portion 42 goes to step S338. If the worker B or worker C is existent in a block of (6, 7) in FIG. 10, the search portion 42 determines that another participant is not included in any of the adjacent blocks (step S334 in FIG. 8). If another participant is included in the adjacent block, the search portion 42 obtains adjacent blocks of the afore-described another participant to add to the original adjacent blocks (step S335). Here, the search portion 42 obtains the adjacent blocks of the worker C and adds them to the original adjacent blocks.

The search portion 42 checks whether all the participants are respectively included in any of the adjacent blocks (step S336). I fall the participants are not included in the adjacent blocks, the search portion 42 goes back to step S334. Here, the worker B is not included in one of the adjacent blocks, the search portion goes back to step S334 to check whether the worker B is included in the adjacent block. As a result of this, the worker B is included in the adjacent block. The search portion 42 completes the determination when all the participants specified are included in the adjacent blocks (step S336 in FIG. 8). If all the participants are included in the adjacent blocks, the search portion 42 adds the time t to a result list (step S337). In this case, the search portion 42 retains as a result that three workers are adjacently existent at the time of 0 second. Then, the search portion 42 determines whether the time t is a final time (step S338 in FIG. 8). If the time t is not the final time, processing goes to a next unit (second) (step S339 in FIG. 8). If the time t is the final time, processing completes.

Figures 11, 12:
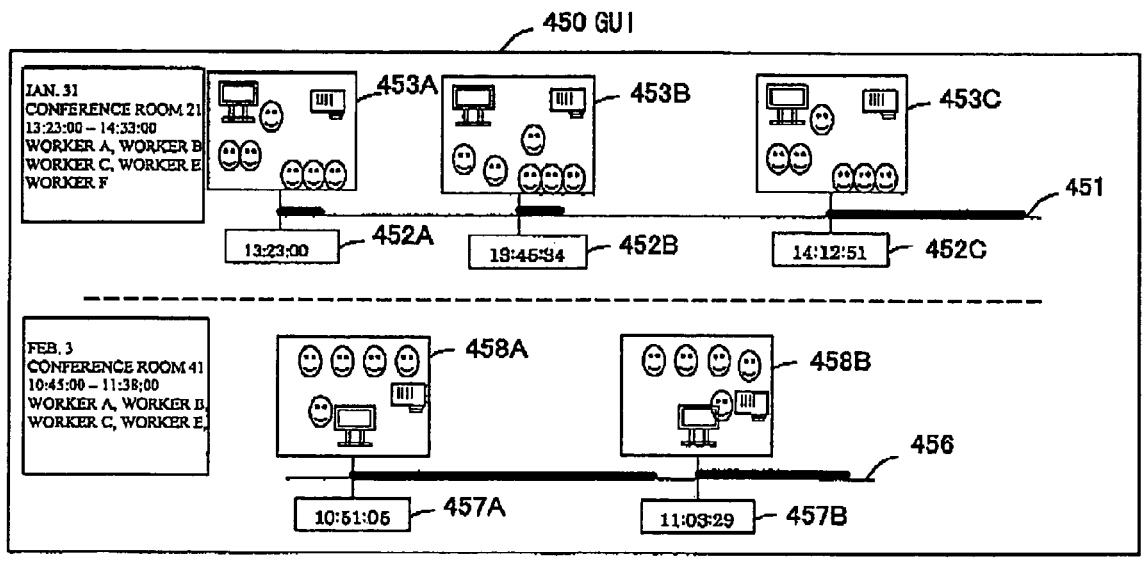
FIG. 11 is a view showing a list created by the search portion for each conference ID.
FIG. 12 is a view showing a GUI provided by a result display portion.

The search portion 42 sets the conference ID of the matched record and the corresponding time to the search result (step S360). Here, the search portion 42 creates a list of the matched conference ID and the corresponding time of the matched conference ID, and sends the list to the result display portion 44 as a search result. FIG. 11 is a view showing the list created by the search portion 42 for each conference ID. A result display portion 44 receives the search result from the search portion 42 and displays the list on the GUI (step S500 in FIG. 6). In this example, there is only one scene, and accordingly, the process in step S400 is not implemented especially.

FIG. 12 is a view showing a GUT 450 provided by the result display portion 44. The result display portion 44 provides timelines 451 and 456 with respect to the list shown in FIG. 11 and displays the timelines 451 and 456 having different thicknesses to be distinguishable, with respect to the searched time slot, so as to show the scene that the search portion 42 has searched from the image information. Also, the result display portion 44 extracts initial scenes of the timelines 451 and 456 from the video data to create thumbnails (reduced images) thereof, and displays thumbnails 453A through 453C, 458A, and 458B together with time information 452A through 452C, 457A, and 457B on the timelines 451 and 456. In this manner, the result display portion 44 creates the thumbnails of the scenes searched by the search portion 42 and displays the thumbnails, thereby enabling the user to understand the overview of the scenes searched.

Figure 13:
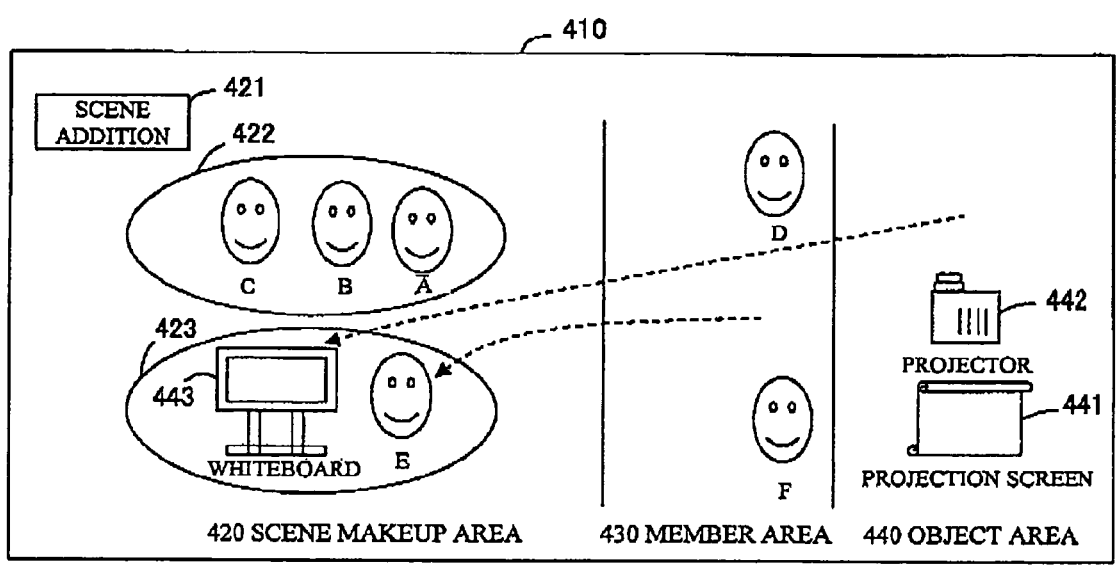
FIG. 13 is a view showing a GUI provided by the query receiving portion.

Subsequently, the user remembers that the worker E was delivering the presentation next to the white board, and adds the scene. FIG. 13 is a view showing the GUI 410 provided by the query receiving portion 41. First, the query receiving portion 41 detects that the user pushed the scene addition button 421 by using mouse or the like, and displays a scene area 423. Then, the user drags and drops the icon 443 of the worker E and the icon of the white board onto the scene area 423 by mouse. The query receiving portion 41 creates the search request from the state of GUI, whenever the user makes a change on the GUI 410, and sends the search request to the search portion 42 (step S100, step 200 in FIG. 6).

The search request issued in the state where the workers A, B, and C are arranged on the scene area 422, as a scene 1, and the worker E and the white board are arranged on the scene area 423, as a scene 2, and are shown as below.

Scene 1: worker A, worker B, worker C
Scene 2: worker E, whiteboard

The search portion 42 receives the search request from the query receiving portion 41 and searches the conference DB 30. The search portion 42 searches for a scene that includes the scene l and the scene 2 (under the condition of AND). First, the search portion 42 carries out a search for the scene 1, yet this is conducted in the same procedure as described above and a description is omitted here. Then, the search portion 42 carries out a search for the scene 2. The scene 2 includes a device instead of a participant, yet the device is also represented by the positional information and the state in the data representation. Therefore, the scene 2 is searched in the same manner as the scene 1. That is to say, the search portion 42 searches for the conference that includes the worker E and the white board, and further searches for the time while the white board is existent in the adjacent block of the worker E, with respect to the operation state of the matched conference.

FIG. 14A shows the search result of the scene 1. FIG. 14B shows the search result of the scene 2. The search portion 42 obtains a common portion in the corresponding times of the search results of the respective scenes (step S400 in FIG. 6). The search portion 42 deletes the conference ID 0124, in this case, because the conference ID 0124 is not included in the result of the scene 2. FIG. 15 is a view showing an example of the search result of the common portion of the scene 1 and the scene 2. The search portion 42 extracts the times searched in both scenes of the conference ID 0123. Here, extracted is a time slot that includes the scene 1 and the scene 2 from 3seconds after the beginning of the conference continuing to 288 seconds. The search portion 42 sends the search result obtained to the result display portion 44. The result display portion 44 receives the search result from the search portion 42, and displays the search result on the GUI (step S500 in FIG. 6).

Figure 16:
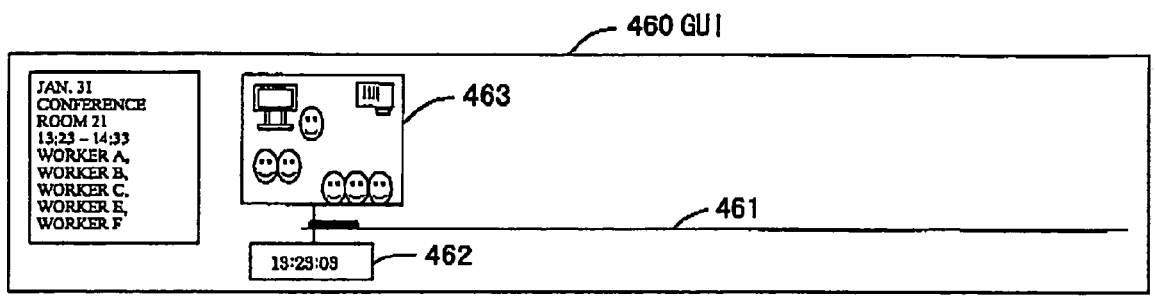
FIG. 16 is a view showing a GUI provided by the result display portion.

FIG. 16 is a view showing a GUI 460 provided by the result display portion 44. The result display portion 44 provides a timeline 461 as a display example as described, and displays the timeline 461 having different thicknesses according to the time slot searched. The result display portion 44 extracts the scene of the initial time of the timeline 461 from the video data to create the thumbnail thereof, and displays a thumbnail 463 together with time information 462 on the timeline 461. When the user operates the mouse or the like to click the thumbnail 463, the result display portion 44 sends the time of the thumbnail 463 clicked and the conference ID to the search portion 42. The search portion 42 obtains the video of the conference with the conference ID, and starts up a video player to reproduce the video from the time of the thumbnail. In accordance with the present embodiment of the present invention, with the positional information of the person or object makes it possible to narrow the search without using the layout of the conference room. In particular, it is possible to search for a scene in the image as a search keyword of the person or object existent around the user or around a main speaker.

Figure 17:
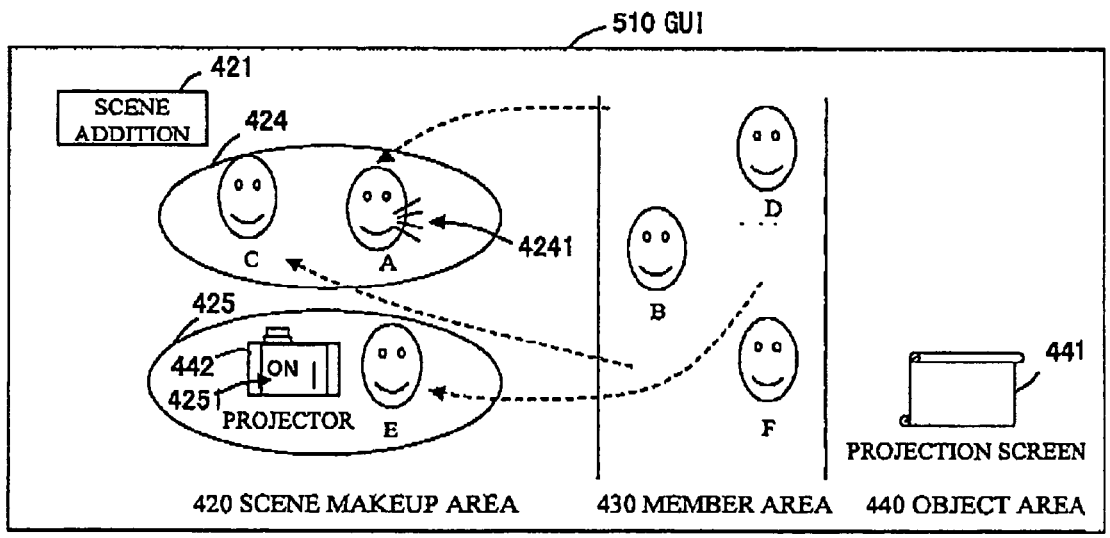
FIG. 17 is a view showing a GUI provided by the query receiving portion.

A description will now be given of a second embodiment of the present invention. In accordance with the second embodiment of the present invention, a description will be given of an example where a search can be carried out by specifying the remark state, the operation state of the device, in addition to the adjacent positions of the participants or devices. FIG. 17 is a view showing a GUI 510 provided by the query receiving portion 41. Assuming that the user likes to remember that the user (the worker C) was taking something important with the worker A, who is existent next to the worker C. The query receiving portion 41 monitors whether the user pushes the scene addition button 421 by mouse or the like, and creates a scene area 424. The user arranges the icons of the worker C and worker A on the scene area 424, and double clicks the worker A by mouse to specify that the worker A is making a remark. Then, the query receiving portion 41 gives a remark mark 4241 to the worker A.

Then, the user remembers that the worker E was near the projector and the projector was ON, and pushes the scene addition button 421. Then, the query receiving portion 41 creates a scene area 425. The user arranges the icons of the worker E and the projector on the scene area 425 by using mouse or the like, and double clicks the projector to specify that the power thereof is ON. The query receiving portion 41 gives a character 4251 of "ON" to the projector. The query receiving portion 41 generates the search request from the state of the GUI whenever the user makes a change on the GUI 510, and gives the search request to the search portion 42.

The search request issued immediately after the above-described scene 1 and scene 2 is shown below.

Scene 1: worker A: remark, worker C
Scene 2: worker E, projector: ON

The search portion 42 searches the metadata of the conference according to the search request received from the query receiving portion 41 The process flow is different from that described above in that the search portion 42 acquires the positional information on the basis of the remark state or operation state of the first participant or device. The search portion 42 acquires adjacent blocks on the basis of the positional information obtained. Here, the search portion 42 carries out a search according to not only the positional information but also the operation state, if the operation state of the participant or device is specified. That is to say, in the example of the scene 1, the search portion 42 searches for the positional information when the worker A is making a remark.

The search portion 42 subsequently obtains the adjacent blocks in the same manner, if the position can be specified. The search portion 42 determines whether another participant or device in the specified operation state is included in the adjacent block at a given time (step S334 in FIG. 8). If another participant or device in the specified operation state is included in one of the adjacent blocks, the search portion 42 further obtains adjacent blocks of the-afore-described participant or device, adds further obtained adjacent blocks to the existent adjacent blocks, and goes back to step S334.

In checking whether another participant or device is included in the adjacent block, the search portion 42 determines whether another participant or device having the operation state is included, if the operation state is specified. If the operation state is not specified, the operation state is not checked as described in the first embodiment of the present invention. In the example of the scene 1, the search portion 42 searches for a case where the worker C is existent in the adjacent block, regardless of the operation state, at a given time when the worker A is making a remark. With respect to the scene 2, the search portion 42 searches for a time slot when the projector is existent in the state of ON in one of the adjacent blocks of the worker E.

FIG. 18A is a search result of the scene 1. FIG. 18B is a search result of the scene 2. The search portion 42 obtains a common portion in the corresponding times of the search results of the respective scenes (step S400 in FIG. 6). The search portion 42 deletes the conference ID 0123, in this case, because the conference ID 0123 is not included in the result of the scene 2. The search portion 42 extracts the times searched in both scenes in the conference ID 0124. For instance, time slots common to the scene 1 and scene 2 are 803 second, 804 second, 821 second, 1113 second, 1754 second, 1755 second, and 1758 second after the beginning of the conference. The worker A and worker C are existent close to each other in the afore-mentioned scenes, the worker A is making a remark, and the worker E is existent near the projector that is ON. The search portion 42 sends the search result to the result display portion 44. The result display portion 44 displays the search result received from the search portion 42 on the GUI.

Figure 19:
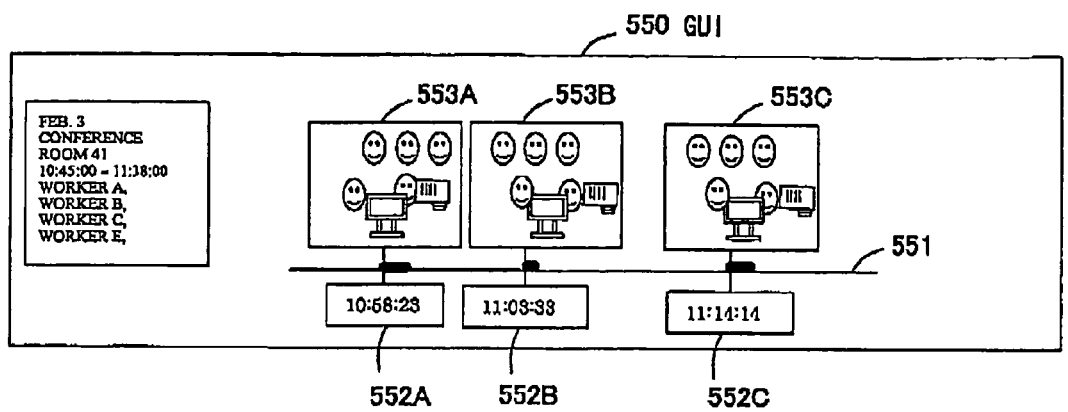
FIG. 19 is a view showing a GUI provided by the result display portion.

FIG. 19 is a view showing a GUI 550 provided by the result display portion 44. The result display portion 44 displays, as a display example, the timelines of the corresponding time slots to have different thicknesses on a timeline 551, as described in the first embodiment of the present invention. The result display portion 44 extracts the scene of the initial time in the continuous period from the video data to create the thumbnail thereof, and displays thumbnails 553A through 553C together with time information 552A through 552C on the timeline 551.

In the afore-mentioned example, when the scene that includes a remark is searched for, there is a possibility that lots of scenes of a short time are searched. In this case, the thumbnails 553A through 553C are increased, and there is a possibility of causing a complicated display. To solve this problem, the result display portion 44, for example, may regard the corresponding scenes as a continuous period within a certain period of time and may display as such. In this example, if there are identical scenes within 60 seconds, for example, the earlier scene is regarded as continuous. The corresponding times 803, 804, and 821 are considered continuous from the time 803 to the time 821. The corresponding time 1113 is solely considered as one scene. The corresponding times 1754, 1755, and 1758 are regarded as continuous from the time 1754 to the time 1758. In accordance with the present embodiment of the present invention, it is possible to search for a scene by specifying not only adjacent positions of the participants and devices but also the remark state of the participant or operation state of the device.

A description will be given of a third embodiment of the present invention. In accordance with the third embodiment of the present invention, a description will be given of an example where a search can be carried out in consideration of which the participant faces, in addition to whether the participant or device is adjacently provided.

FIG. 21 is a view showing a data structure of the conference data in the conference DB 30. FIG. 21 is different from FIG. 2 in that the conference DB 30 stores the information on which the body of the participant faces in each time. For example, in the data of (0004) second after the beginning of the conference, as shown below, the worker A is existent at 2 in X-coordinate and 4 in Y-coordinate in the conference room, does not make a remark (0), and the body thereof faces the south (S). The worker B is existent at 4 in X-coordinate and 4 in Y-coordinate, does not make a remark (0), and the body thereof faces the west (W). The worker C is existent at 3 in X-coordinate and 4 in Y-coordinate, does not make a remark (0), and the body thereof faces the south (S).

0004, 2:4;0:S, 4:4:0:W, 3:4:0:S, 2:3:0, 1:3:0, 2:1:0

It does not matter how to acquire the direction of the body. It is desirable to give the afore-described information automatically, yet the information may be input manually. In order to give the information automatically, it can be considered that the direction of the face is confirmed in a video image that stores the conference or the direction of the chair is substituted for the direction of the body by installing an ultrasonic sensor or RFID tag on the chair.

Figure 20:
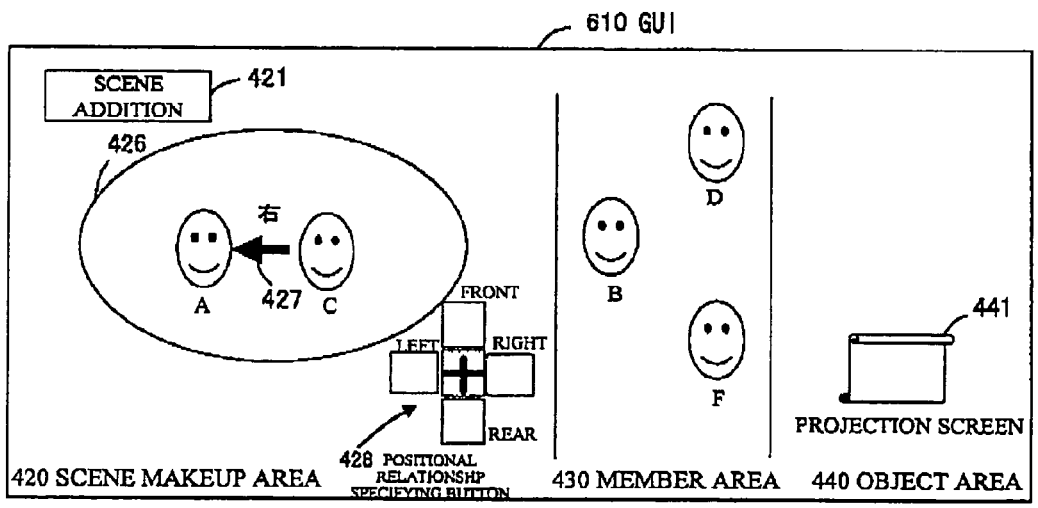
FIG. 20 is a view showing a GUI provided by the query receiving portion.

FIG. 20 is a view showing a GUI 610 provided by the query receiving portion 41. The query receiving portion 41 provides a positional relationship specifying button 428 on the search screen, and serves as a portion that specifies a relative position of a second object to a first object. The second object is the worker A, and the first object is the worker C. The query receiving portion 41 also receives a search request according to the operation state of the positional relationship specifying button 428. With the positional relationship specifying button 428, it is possible to specify the relative positional relationship between the objects such as right side, left side, front, rear, or the like. As a clue or keyword that the user likes to review, the user remembers that the worker A was existent on the right side of himself or herself (the worker C). The query receiving portion 41 detects that the user pushed the scene addition button 421 by mouse or the like, and generates a scene area 426. The user arranges the icons of the worker C and the worker A on the scene area 426, and then clicks the worker C, a right button, and the worker A, in this order by mouse. Then, the query receiving portion 41 displays an arrow 427 pointing to the worker A from the worker C. This means that the worker A is existent on the right side of the worker C. The query receiving portion 41 generates the search request from the state of GUI, whenever the user makes a change on the GUI 610. The query receiving portion 41 sends this information to the search portion 42.

The search request immediately after the scene 1 is made up is described below.

Scene 1: worker C: right: worker A

The search portion 42 searches the metadata in the conference DB 30 according to the search request received from the query receiving portion 41.

Figures 22A, 22B, 23:
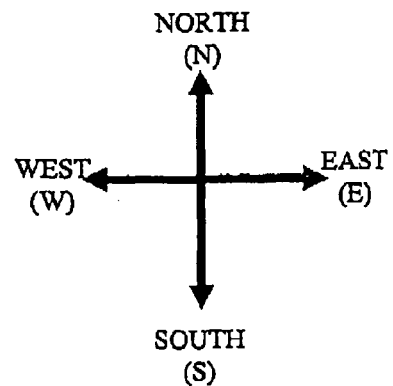
FIG. 22A and FIG. 22B show a participant and adjacent blocks.
FIG. 23 shows a time slot where the worker A is existent on the right side of the worker C.

Here, the search portion 42 determines whether another, participant is included in the adjacent block at a given time (step S334 in FIG. 8). The search portion 42 determines the positional relationship with respect to front, rear, left, and right as well as the adjacent determination. In this case, first, the search portion 42 acquires the adjacent blocks of the worker C and the direction of the body of the worker C at the same time. For example, the worker C is existent at a position of X=3 and Y=4 at 0004 second, and faces the south (S). Then, the search portion 42 acquires the position of the right side of the worker C. At this time, the north, south, east and west and rectangular blocks into which the room is segmented are described below. FIG. 22A and FIG. 22B show a participant and adjacent blocks. In this case, the worker C is existent at (3, 4), and faces the south. The right side of the worker C is (2, 4).

The search portion 42 searches for a time slot that includes the worker A at (2, 4). The search portion 42 further obtains the adjacent blocks of the worker A, if the worker A is included in (2, 4). If the positional relationship such as front, rear, right, and left is specified, the search portion 42 calculates which block other participants are included in, and searches for the time slots that respectively include all the participants in the positions and direction that are specified. In this case, the search portion 42 searches for the time slot where the worker A is existent on the right side of the worker C. FIG. 23 shows the time slot where the worker A is existent on the right side of the worker C. The search portion 42 sends this search result to the result display portion 44. The result display portion 44 receives the search result and displays the search result on the GUI.

Figure 24:
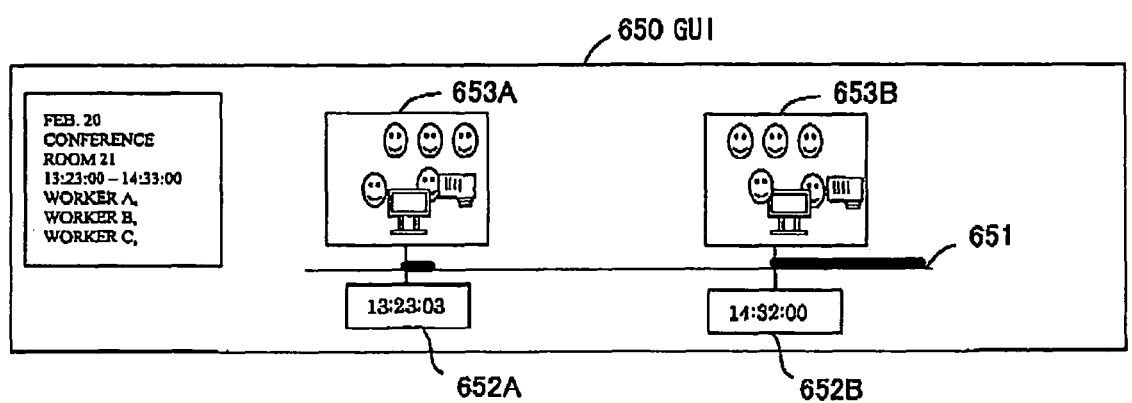
FIG. 24 is a view showing a GUI provided by the result display portion.

FIG. 24 is a view showing a GUI 650 provided by the result display portion 44. The result display portion 44 and displays a timeline 651 having different thicknesses according to the corresponding time slots, as in the above-described embodiments. The result display portion 44 extracts the scene of the initial time of the continuous time from the video data, creates the thumbnail thereof, and displays thumbnails 653A and 653B on the timeline 651 together with time information 652A and 652D. In accordance with the third embodiment of the present invention, it is possible to carry out a search in consideration of the direction of the person, in addition to whether or not the participant or device is adjacently provided.

In addition, in accordance with the present embodiment of the present invention, four directions of the north, south, east and west are distinguished, yet eight directions in total may be distinguished by adding the northeast, northwest, southeast, and southwest. If the northeast, northwest, southeast, and southwest are added, the rectangular having the front, rear, right, and left may be distinguished by adding upper right, lower right, upper left, and lower left.

In accordance with the above-described embodiments, it is possible to search for a scene by combining fragmentary scenes and searching for the scene that includes a fragmentary scene, even if the user does not remember the layout of the room. The fragmentary scene includes cases where the participants, the participant and device, the devices are adjacently provided, the remark state of the participant, and the operation state of the device. When multiple scenes are specified, the time commonly having the multiple scenes is obtained (by AND search) (step S400 in FIG. 6), yet, as an alternate example, the time having any one of the multiple scenes may be obtained (by OR search).

The conference DB 30 and the information processor 40 may be respectively composed of a server, and the information processor 40 may provide the above-described processes to a client terminal connected via the network. In the above description, as an example, the result display portion 44 displays the search result on the display device, yet the search result may be printed out by a printer. In accordance with the above-mentioned embodiments, the conference room has been exemplarily described as a space to be captured by an image capturing portion, yet the present invention is not limited to this. Any type of space is applicable, if the space can be captured by the image capturing portion. In addition, in accordance with the above-mentioned embodiments, something existent in the conference room has been exemplarily described as an example of an object, yet the present invention is not limited to this. Any type of object in the conference room is applicable. Furthermore, in accordance with the above-mentioned embodiments, the conference image has been exemplarily described as an example of an image, yet the present invention is not limited to this. Any type of image is applicable, if the image can be captured by the image capturing portion.

In the information processing system, it is desirable that the object be at least one of a person, device, or facility existent in the given space.

In the information processing system, the receiving portion may provide a first portion that specifies the additional information on a search screen, and receives the search request according to an operation of a second portion that specifies the additional information. With the present invention, it is possible to search for a scene while the user is being supported to remember the conference.

The present invention provides an information processing system and information processing method, whereby a specific scene can be narrowed from the image by utilizing the positional relationship to objects such as a person or thing.

The information processing method of the present invention is realized by the information processor 40. The information processor 40 utilizes a CPU (Central Processing Unit), ROM (Read Only Memory), RAM (Random Access Memory), or the like. The steps of the information processing method are implemented when CPU executes a given program.

Although a few embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2005-236175 filed on Aug. 16, 2005 including specification, claims, drawings, and abstract is incorporated herein by reference in its entirety.

What is claimed is:

1. An information processing system comprising:
an image capturing portion that captures scenes of image information of a given space;
an object position specifying portion, located separate from the image capturing portion in the given space, that specifies an actual spatial location of a plurality of objects including a device within the given space;
an audio capturing portion that measures an attribute of an audible ambience in the given space, and records the audible ambience when the measured attribute meets a predetermined condition;
a memory portion that stores each scene of image information of the given space captured by the image capturing portion while simultaneously storing and associating positional information on the plurality of objects including the device existent in the given space according to the actual spatial location of the plurality of objects including the device within the given space provided by the object position specifying portion and an operation state of the device;
a query receiving portion equipped with a GUI (Graphical User Interface) that receives specifying information that specifies the one of the plurality of objects as a search request, wherein the GUI includes a plurality of icons that each represents one of a plurality of objects in the scene;
wherein the query receiving portion further receives a request to indicate the position of a least one of the plurality of icons that represent objects in the scene, by dragging and dropping one of the plurality of icons to an area of the GUI that represent the given space, and, in response to receiving the position of at least one of the plurality of icons in the query receiving portion, the query receiving portion creates the search request;
a search portion that searches the image information stored in the memory portion for the scene where the one of the plurality of objects is existent in the given position on the basis of the search request; and
a display portion that displays a search result searched by the search portion.

2. The information processing system according to claim 1, wherein the plurality of objects further includes at least one of a person, and a facility existent in the given space.

3. The information processing system according to claim 1, wherein:
the memory portion stores, as additional information, at least one of an identifier of each of the plurality of objects including the device, an identifier of the given space, and a remark state of a person, if one of the plurality of objects is a person;
the receiving portion receives the additional information as the search request; and
the search portion searches the image information stored in the memory portion for a scene that matches the search request.

4. The information processing system according to claim 1, wherein the memory portion stores additional information for each scene of the image information.

5. The information processing system according to claim 3, wherein the receiving portion provides a first portion that specifies the additional information on a search screen, and receives the search request according to an operation of a second portion that specifies the additional information.

6. The information processing system according to claim 1, wherein the receiving portion provides an input for specifying additional information on a search screen, and receives the additional information in a format where objects corresponding to the additional information are arranged in an area.

7. The information processing system according to claim 1, wherein the receiving portion provides a third portion that specifies a relative position of a second object to a first object, and receives the search request according to an operation of a third portion that specifies the relative position of the second object.

8. The information processing system according to claim 1, wherein the display portion further displays the scene to be distinguishable.

9. The information processing system according to claim 1, wherein the display portion further creates a reduced image of the scene searched by the search portion and displays the reduced scene.

10. The information processing system according to claim 1, wherein the memory portion stores each scene of image information and positional information on the plurality of objects by establishing a three-dimensional object space where the plurality of objects are located, and then identifying the actual spatial location of the plurality of objects within the three-dimensional object space.

11. An information processing method comprising:
capturing scenes of image information of a given space by an image capturing portion;
specifying an actual spatial location of a plurality of objects including a device within the given space by an object position specifying portion located separate from the image capturing portion within the given space;
measuring an attribute of an audible ambience in the given space by an audio capturing portion,
recording the audible ambience when the measured attribute meets a predetermined condition;
storing, by a memory portion each scene of image information of the given space captured by the image capturing portion while simultaneously storing and associating positional information on the plurality of objects including the device existent in the given space according to the actual spatial location of the plurality of objects including the device within the given space provided by the object position specifying portion and an operation state of the device;
receiving, by a query receiving portion equipped with a GUI, specifying information that specifies one of the plurality of objects as a search request, wherein the GUI includes a plurality of icons that each represents one of a plurality of objects in the scene;
wherein the query receiving portion further receives a request to indicate the position of a least one of the plurality of icons that represent objects in the scene, by dragging and dropping one of the plurality of icons to an area of the GUI that represent the given space, and, in response to receiving the position of at least one of the plurality of icons in the query receiving portion, the query receiving portion creates the search request;
searching, by a search portion, image information of the given space for the scene where the one of the plurality of objects including the device is existent in a given position on the basis of the search request, the image information of the given space being captured by the image capturing portion and simultaneously stored and associated with positional information on the plurality of objects including the device existent in the given space according to the actual spatial location of the plurality of objects including the device within the given space provided by the object position specifying portion and with an operation state of the device; and displaying, by a display portion, a search result searched by the search portion.

12. The information processing method of claim 11, wherein the image information and the positional information on the plurality of objects are stored by establishing a three-dimensional object space where the plurality of objects are located, and then identifying the actual spatial location of the plurality of objects within the three-dimensional object space.

* * * * *